United States Patent [19]

Theurer et al.

[11] 3,939,331

[45] Feb. 17, 1976

[54] RAILROAD TRACK SURVEY APPARATUS

[75] Inventors: Josef Theurer, Vienna; Keith L. Hall, Linz; Franz Eglseer, Ohlsdorf, all of Austria

[73] Assignee: Franz Plasser Bahnbaumaschinen Industriegesellschaft m.b.H., Vienna, Austria

[22] Filed: Mar. 18, 1974

[21] Appl. No.: 452,202

Related U.S. Application Data

[63] Continuation-in-part of Ser. No. 316,028, Dec. 18, 1972, abandoned.

[30] Foreign Application Priority Data

Dec. 24, 1971  Austria .............................. 11119/71

[52] U.S. Cl. ........ 235/151.32; 73/146; 235/92 MT; 235/92 DN; 235/151.3
[51] Int. Cl.² .................. G01B 7/14; H03K/13/175
[58] Field of Search ....... 235/150.2, 150.24, 151.13, 235/92 AE, 92 MT, 92 NT, 151.3, 151.32; 73/146, 105; 33/144, 146; 328/150

[56] References Cited
UNITED STATES PATENTS

| | | | |
|---|---|---|---|
| 3,151,235 | 9/1964 | Greenshields | 235/92 AE |
| 3,392,451 | 7/1966 | Lombardo | 73/146 |
| 3,571,705 | 3/1971 | Crane et al. | 73/146 |
| 3,648,183 | 3/1972 | Alton et al. | 328/150 |
| 3,718,040 | 2/1973 | Freeman et al. | 73/146 |
| 3,733,424 | 5/1973 | Pitts et al. | 235/92 MT |
| 3,798,454 | 3/1974 | Weiss | 235/92 AE |

Primary Examiner—Felix D. Gruber
Attorney, Agent, or Firm—Kurt Kelman

[57] ABSTRACT

The error signal corresponding to the deviation of the actual track position from the desired track position is applied to three pairs of threshold stages each pair consisting of one stage furnishing a threshold output signal if a positive error signal has an amplitude exceeding a predetermined value and a second stage for forming the same function for a negative error signal. The threshold output signals are stored in associated flip-flops. The flip-flops are reset whenever a flip-flop indicative of a higher amplitude error signal is set. Whenever the lowest threshold stage resets, indicating that the error signal is passing close to zero, gates are activated which advance counters connected to the flip-flops if the flip-flop has been set. In a digital embodiment, the comparison takes place on an amplitude basis only, the sign controlling the transfer to counters associated with negative and positive error signals respectively. The signal for initiating the counter advance is derived from an exclusive OR circuit which furnishes an output when the sign of the last received error signal differs from the sign of the last previously received error signal. The counters are thus advanced only when a change in sign of error signal occurs.

18 Claims, 10 Drawing Figures

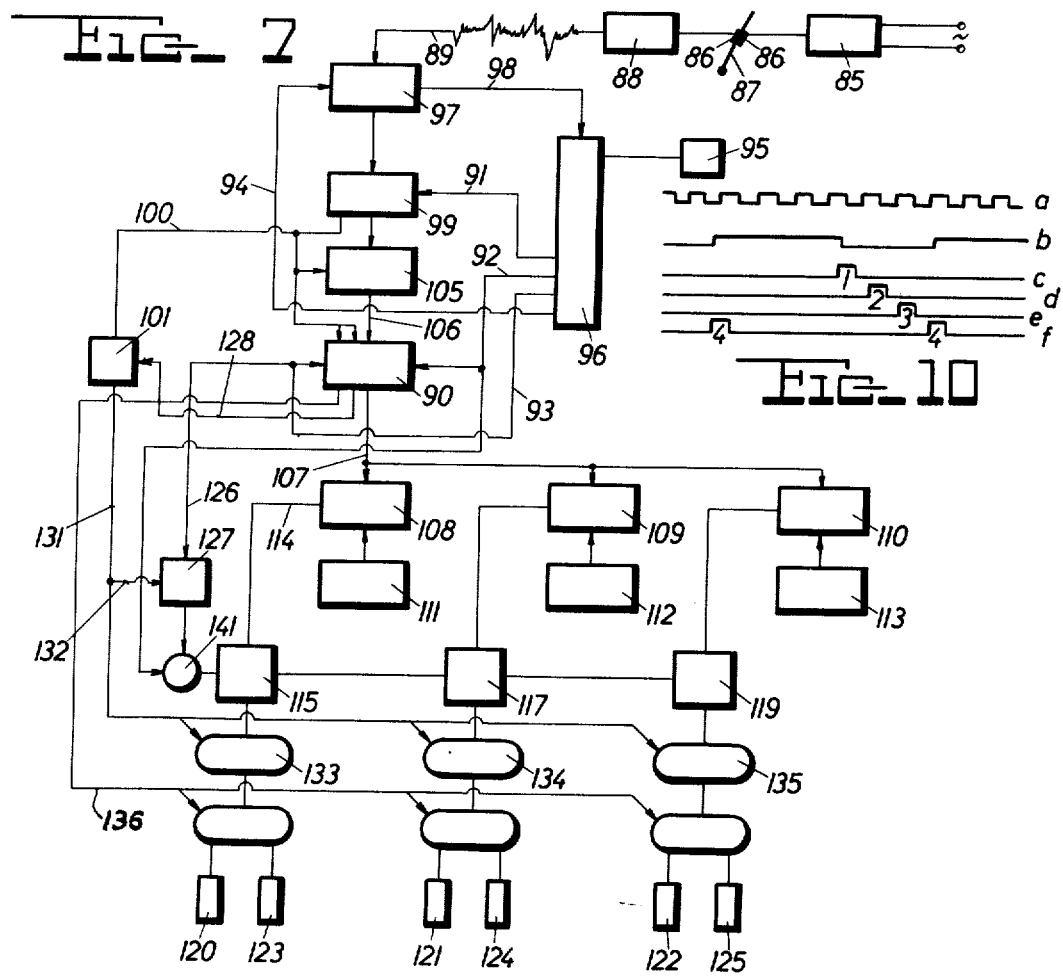

RAILROAD TRACK SURVEY APPARATUS

CROSS-REFERENCE TO RELATED APPLICATION

This is a continuation-in-part of our co-pending application Ser. No. 316,028, filed Dec. 18, 1972, for "Track Position Survey Apparatus", now abandoned.

BACKGROUND OF THE INVENTION a. Field Of The Invention

The present invention relates to improvements in apparatus mounted on a railroad track survey car for determining the difference between the actual and a desired position of the track whereon the car moves.

b. Discussion Of The Prior Art

U.S. Pat. No. 3,610,894, dated Oct. 5, 1971, proposes a peak analysis system wherein the error signals are measured only between maxima and minima, without reference to a datum line, which sometimes leads to incorrect results. All errors above and below the datum line (which is not taken into account by the system disclosed in that patent) are evaluated equally, and after a single pass of the survey car over a surveyed track section, no direction or trend, i.e. in which direction the error curve deviates from the datum line, can be detected. Such a trend can be detected only after several passes over the track.

It is the primary object of this invention to provide apparatus which makes it possible to evaluate track position errors according to the direction and magnitude of the deviation of the track from a datum line, and to record and store this information.

SUMMARY OF THE INVENTION

This and other objects are accomplished in accordance with the invention by providing an apparatus which is adapted for mounting on a railroad survey car to determine the difference between the actual and the desired position of the railroad track upon which the survey car travels. The apparatus comprises a transducing means functionally coupled to the track beneath the car, for generating an analog error signal proportional to the deviation of the actual position of the track from a desired position and means for generating a reference signal representative of a datum line for the desired track position.

The digital embodiment also includes means for supplying periodic timing signals and an analog-to-digital converter connected to and synchronized by said signal supplying means for converting the analog output of the transducing means into binary form, the reference source defining a particular binary output from said analog-to-digital converter as a datum line. The second embodiment further includes means, connected to the output of the analog-to-digital converter, for comparing successive binary output signals from the analog-to-digital converter to reference signals, thereby to classify error signal peaks into a number of different amplitude ranges. Whenever the error signal changes sign, a counter associated with the largest amplitude range in which a peak has registered and which is associated with the sign of the error signal producing said peak is advanced by one count.

The above and other objects, advantages and features of the present invention will become more apparent from the following detailed description of certain now preferred embodiments thereof, when taken in conjunction with the accompanying drawing wherein:

FIG. 7 shows a circuit diagram of yet another embodiment of the invention;

FIG. 8 shows one particular circuit element of the circuit of FIG. 7;

FIG. 9 shows a portion of the circuit diagram of FIG. 7; and

FIG. 10 shows graphs of specific impulses produced in the circuit of FIG. 7.

DETAILED DESCRIPTION OF THE INVENTION

Figure 1:
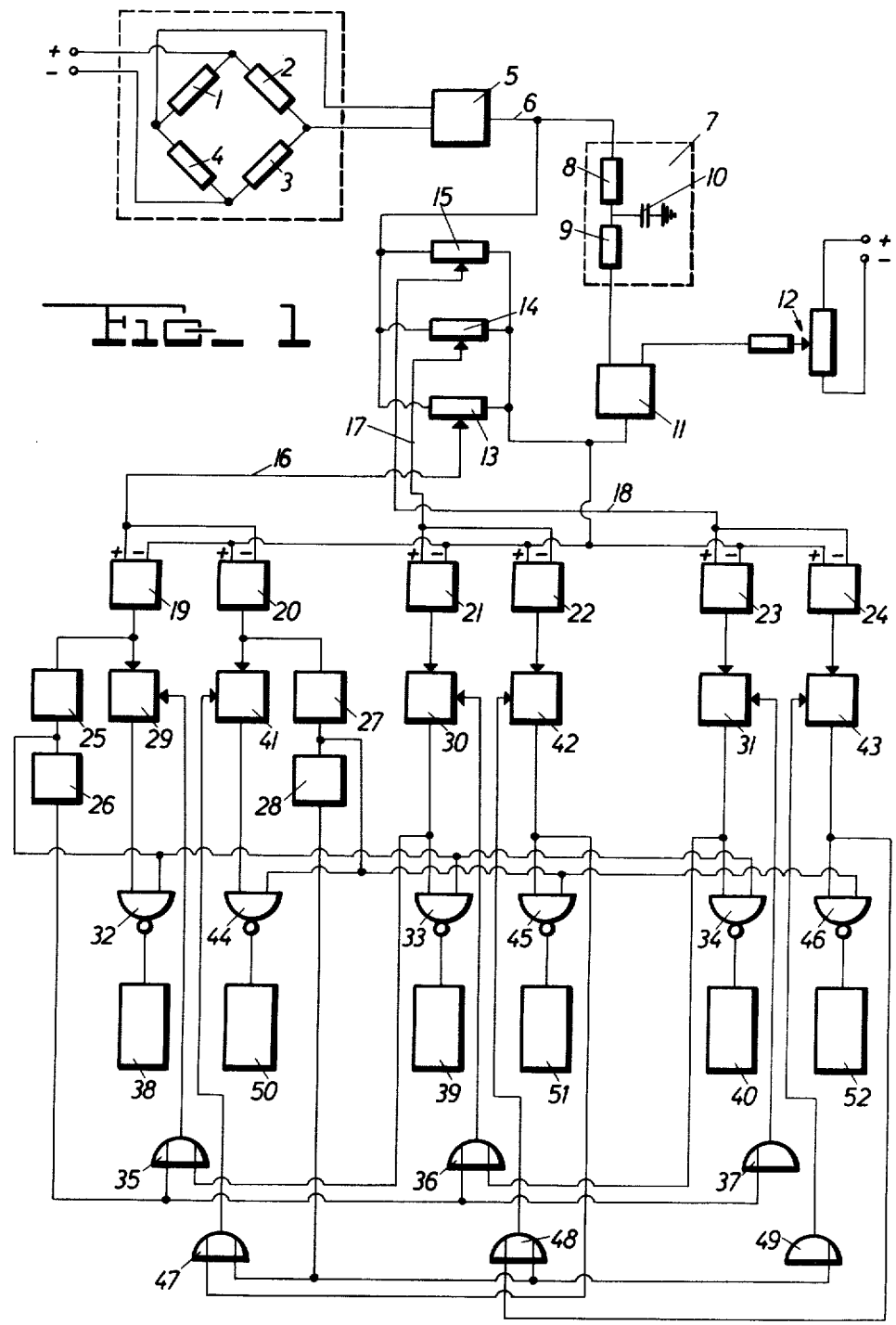
FIG. 1 is a circuit diagram of a first embodiment of this invention.

Referring now to FIG. 1, there is shown a Wheatstone bridge comprising four strain gages 1, 2, 3, 4. The strain gages are bent or flexed in response to a specified railroad track parameter (as will be further explained in connection with FIGS. 4 to 6) to produce reference signals which are a direct function of the track parameter, and thus comprise an error signal transducer. Direct current is fed to two corners of the Wheatstone bridge and the output signal of the bridge is taken from the two other bridge corners and fed to signal amplifier 5, the output signal from the bridge being proportional to the flexing of the strain gages. The output of amplifier 5, on conductor 6, may be either a positive or a negative voltage, the value of this voltage being proportional to the flexing of the strain gages, i.e. to changes in the specified track parameter. In this way, conductor 6, carries error signals produced by the strain gages whenever the specified track deviates from a datum line.

The error signals are fed by conductor 6 into a filter circuit 7 which comprises a pair of resistors 8, and 9 and a capacitor 10. The time constant of filter circuit 7 is large compared to the rapid changes in the input signals coming from line 6. In a typical track survey car, a time constant of about one minute is advantageously used. Thus, the high frequency component of the error signal is filtered out in filter circuit 7, and the filtered output of circuit 7 comprises the low frequency component of the error signal. The filtered output signal is next fed to a signal amplifier 11 having a variable resistance 12 connected thereto which is adjusted so that a zero input thereto produces a zero output therefrom.

The direct error signal from line 6 and the reference signal from amplifier 11 are fed to three voltage dividers 13, 14, 15, each divider having a different value of scale corresponding to the scale of three desired error bands, and six Schmitt triggers 19 to 24 connected thereto and actuated thereby. In this system, the extent of the deviation of the error signal on conductor 6 from the filtered reference signal coming from amplifier 11 may be placed into one of six arbitrary bands, three of these bands being above the reference signal and three bands being therebelow. It is also desirable to indicate the number of signals in each band.

If the difference between the error signal and reference signal is of sufficient magnitude, each voltage divider will deliver an output signal on conductors 16, 17 and 18 connected thereto but differences of minor magnitude will not produce such output signals. As will be explained below, such minor deviations fall into a dead zone for purposes of analysis (see FIG. 2).

Conductor 16 is connected to input terminals of opposite polarity in Schmitt triggers 19, and 20; conductor 17 is connected to input terminals of opposite polarity in Schmitt triggers 21, and 22; and line 18 is connected to input terminals of opposite polarity in Schmitt triggers 23, 24. The other input terminals of all the Schmitt triggers 19 to 24 are interconnected to receive the reference signal from amplifier 11.

The output signals of Schmitt triggers 19 and 20 are fed to a logic circuit comprising four monostable devices 25, 26, 27 and 28. Furthermore, for each of the three positive signal bands, there is provided a flip-flop circuit 29, 30 or 31, a NAND gate 32, 33, or 34, an OR gate 35, 36, or 37, and a counter 38, 39, or 40, respectively. For each of the three negative signal bands, there is provided a flip-flop circuit 41, 42, or 43, a NAND gate 44, 45, or 46, an OR gate 47, 48, or 49, and a counter 50, 51, or 52, respectively.

The functioning of the logic circuit will now be described in connection with an analysis of the signal illustrated in FIG. 2.

Figure 2:
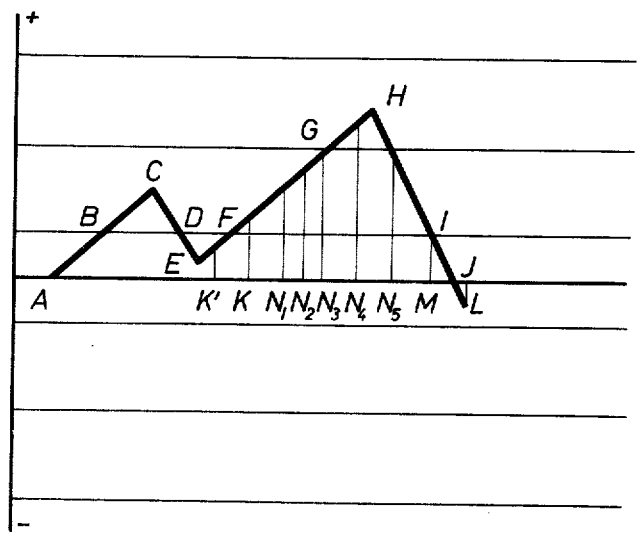
FIG. 2 is a graphical record of a typical input signal to be analyzed.

As shown in FIG. 2, the curve of this signal begins at A on the datum line which is defined by the reference voltage from amplifier 11, crosses at point B the transition line between the dead zone and signal band 1, reaches a peak in this first band at point C, recrosses the transition line into the dead zone at point D, reaches a trough in the dead zone at point E, rises again to pass into signal band 1 at point F, crosses from band 1 into signal band 2 at point G, reaches a peak in band 2 at point H, returns into the dead zone at point I, and reaches the reference voltage or datum line at point J.

When the direct, unfiltered error signal is at point A, it is in equilibrium with the reference voltage and, therefore, no output signal is produced by voltage dividers 13, 14 and 15.

When the error signal voltage reaches point B, the positive output signal from voltage divider 13 causes Schmitt trigger 19 to change its output signal from 0 to 1. This sets flip-flop 29, causing a logic 1 to be applied to one input of NAND gate 32 which is maintained closed at this time by the output signal from monostable device 25 which is a logical 0.

When the error signal rises to point C, where a change in signal direction occurs and, when it later falls to point D, the signal voltage in line 16 is still sufficient to maintain a logical 1 at the output of Schmitt trigger 19. It should be noted that when this output changes to 0, the output of monostable device 25 changes for a brief period of time from 0 to 1. This unlocks NAND gates 32, 33 and 34, which permits the output of flip-flops 29, 30 and 31 to reach counters 38, 39, 40. However, since flip-flops 30 and 31 have a 0 signal at their outputs, counters 39 and 40 will not receive any input. However, multivibrator 29 feeds a logical 1 to counter 38 which records the same. When the output of monostable device 25 returns to logical 0, the output of monostable device 26 will be for a brief time a logical 1. This acts as a re-set signal for multivibrators 29, 30, 31 which re-set signal is fed back to the flip-flops by OR gates 35, 36, and 37 to re-set the outputs of the corresponding flip-flops to 0. Thus, the multivibrators are ready for the next analysis.

At point E, the error signal changes direction again, leaving the dead zone at point F when the voltage of the signal on conductor 16 is again of sufficient magnitude to change the output of Schmitt trigger 19 from a logical 0 to a logical 1.

At point G, the voltage of the error signal in line 17 becomes of sufficient magnitude to change the output of Schmitt trigger 21 from a logical 0 to a logical 1. This signal is fed to NAND gate 33 which is maintained closed at this point by the logical 0 output of monostable device 25. The logical 1 signal of flip-flop 30 also acts a re-set signal for flip-flop 29 to which it is fed by OR gate 35 to re-set the output of flip-flops 29 to logical 0.

At point H, the error signal changes direction again, dropping from its peak to return the output of Schmitt trigger 19 to a logical 0 when the error signal crosses point I. This causes the output of monostable device 25 to change to a logical 1 for a brief period of time, opening NAND gates 32, 33 and 34 and making it possible for the output signals from flip-flops 29, 30, and 31 to reach counters 38, 39 and 40. However, since the output signals of flip-flops 29 and 31 are logical 0 signals, there will be no input to counters 38 and 40. However, since the output of flip-flop 30 is a logical 1, its signal and its alone will be fed to counter 39, thus recording the peak which priorly occurred at point H. When the output signal of monostable device 25 changes to logical 0, the output signal of monostable device 26 will be a logical 1 for a brief period of time. This latter output signal is fed through OR-gates 35, 36, 37 to flip-flops 29, 30, 31 to re-set the outputs thereof to logical 0.

When the error signal passes from band 2 to band 3 (which condition is not shown in FIG. 2), the output of flip-flop 31 would be set at logical 1, and this signal would re-set multivibrator 30 to logical 0, being fed to multivibrator 30 by OR gate 36.

The circuitry operates in a similar manner when the error signal is negative with respect of the datum. In this event, Schmitt triggers 20, 22, and 24, monostable devices 27 and 28, NAND gates 44, 45, 46, OR gates 47, 48, 49, and counters 50, 51, 52 are used in the same manner as hereinabove described.

In this manner, each peak which occurs in any of the six bands is counted independently, the counter being activated each time that the error signal returns to the dead zone from its peak; changes which occur in one or more bands before the dead zone has been reached are not counted.

Figure 3:
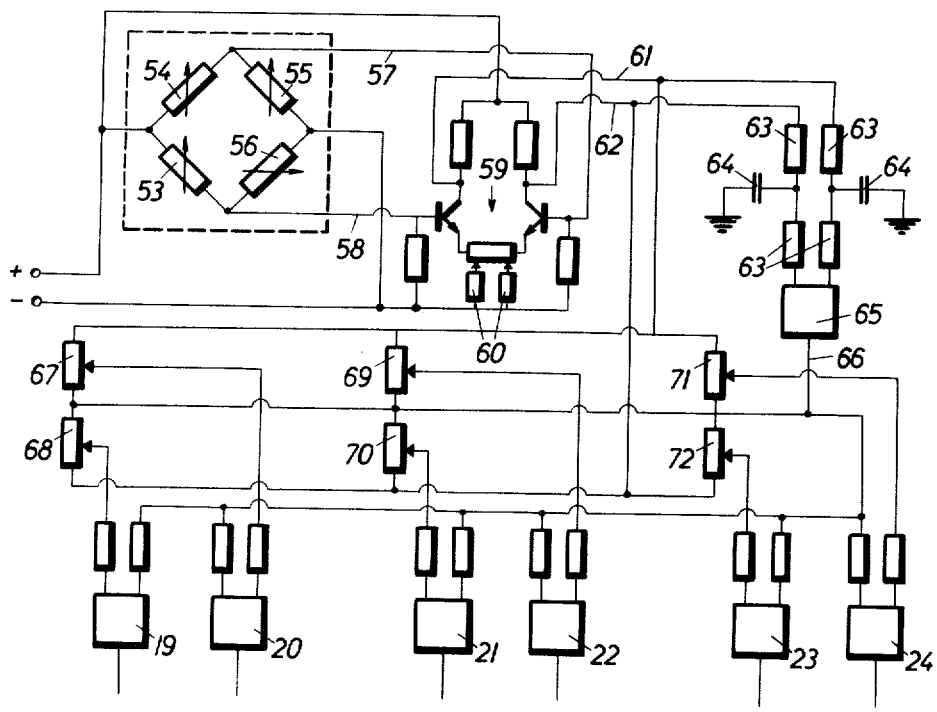
FIG. 3 is a portion of the circuit diagram of a second embodiment of the invention.

FIG. 3 illustrates another embodiment of the anolog signal input arrangement for the logic circuit of FIG. 1, the arrangement and operation of all circuit elements connected to the outputs of Schmitt triggers 19 to 24 being unchanged.

In this embodiment, the variable track parameter to be analyzed mechanically sets four variable resistances 53, 54, 55, 56 arranged into a Wheatstone bridge circuit to produce error signal proportional to the variable parameter. Suitable mechanical coupling elements (not shown) enable resistances 54 and 55 to be rotated clockwise while resistances 53 and 56 are rotated counterclockwise thereby increasing the sensitivity of the bridge. The positive or negative output signals from the bridge, which are of course proportional to the variable parameter to be analyzed, are fed by conductors 57 and 58 to a differential amplifier 59 whose output may be set to zero by a variable resistance 60. Conductors 61 and 62 receive a negative or a positive output signal from differential amplifier 59, which signal will vary in amplitude and sign with the variable parameter to be analyzed. If the variable reference signal contains high as well as low frequencies, the signals in lines 61 and 62 will also contain both types of frequencies. These signals are fed to a pair of filter circuits each of which has an inductive resistance 63 and a capacitor 64. The filter elements are selected such that the filter will filter out error signals of high frequency and will pass only error signals of low frequency. The filtered error signals are next fed to a signal amplifier 65 which produces a reference output signal on conductor 66.

The reference signal is fed by conductor 66 to Schmitt triggers 19 to 24, on the one hand, and to six voltage dividers 67 to 72, on the other hand. The voltage dividers 67, 69 and 71 receive an additional input signal from one output of differential amplifier 59 on conductor 61 while dividers 68, 70 and 72 receive an additional input signal from the other output of differential amplifier 59 on conductor 62. The voltage dividers are set at different values and feed a triggering signal to their associated Schmitt triggers only when the difference between the error signals in lines 61 or 62 and the reference signal coming from amplifier 65 exceeds a set value.

Figure 4:
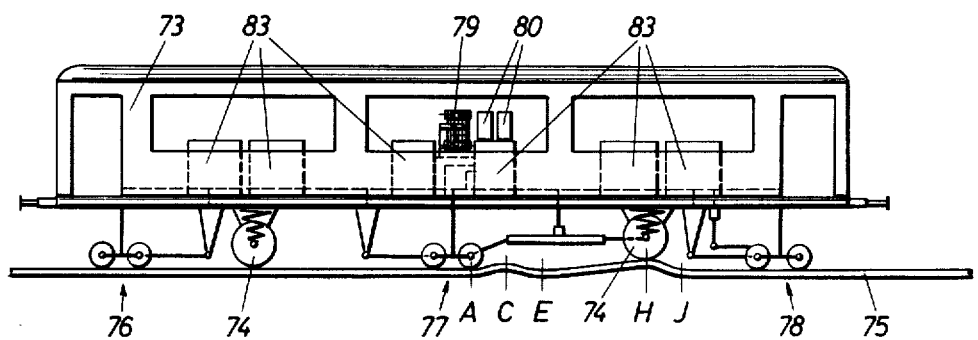
FIG. 4 is a side elevational schematic view of a track survey car whereon the apparatus of the present invention may be mounted.
Figure 5:
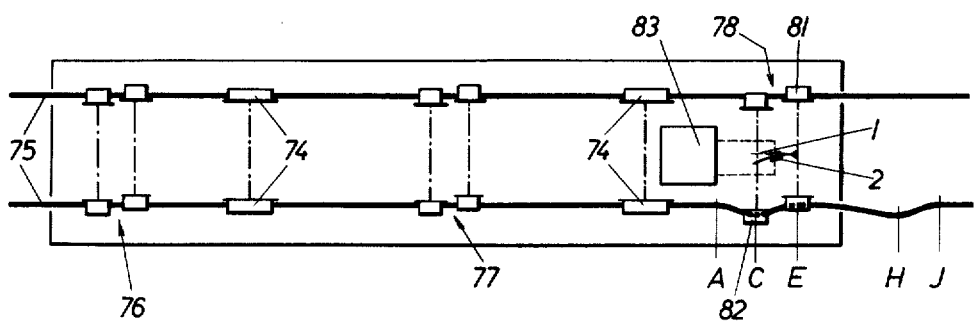
FIGS. 5 and 6 are plan views of the track survey car of FIG. 4.
Figure 6:
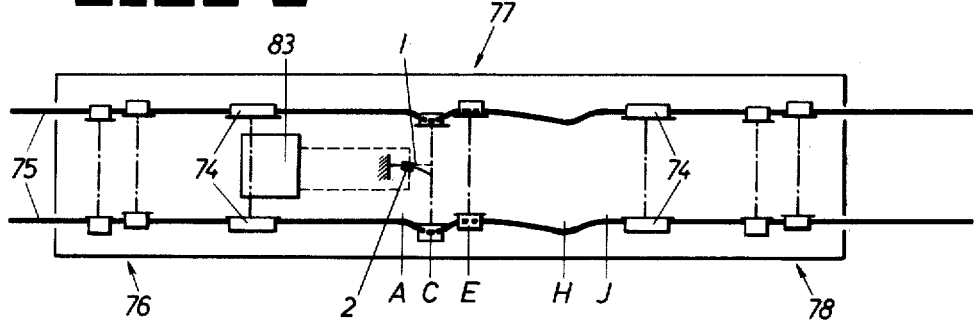

The use of the analysis circuits disclosed in FIGS. 1 or 3 in connection with a track survey car as illustrated in FIGS. 4 to 6.

As shown, the track survey car 73 has undercarriages 74 running on track rails 75. A series of measuring bogies 76, 77 and 78 are connected to the track survey car and run on the track to measure or survey deviations of certain track parameters from a predetermined datum line. For example grade errors (illustrated in FIG. 4,); track gage errors (FIG. 5); and track alignment or ordinate errors (FIG. 6).

The track survey car carries the computer apparatus of this invention and suitable indicating devices, such as a tape recording instrument 79 or an automatic writing instrument 80 for recording and storing the measurements or survey data.

The track position errors indicated in FIGS. 4 to 6 by letters A, C, E, H, and J correspond to these points in the signal curve of FIG. 2 FIG. 4 shows how the wheels of the measuring bogies measure or survey errors in the track grade or vertical track position, the movements of the wheels on the measuring bogies in response to deviations of the track grade from a datum line being transmitted to strain gages or potentiometers to produce error signals proportional to such deviations. Such apparatus per se forms no part of the present invention and has been disclosed, for instance, in copending application Ser. No. 155,861, filed June 23, 1971, now U.S. Pat. No. 3,816,927, of which two of the present joint inventors Theurer and Eglseer are the joint inventors.

The schematic plan view of FIG. 5 indicates that measuring bogie 78 is arranged to measure or survey the track gage, flanged wheel 81 of the bogie being pressed against one rail while flanged wheel 82 is pressed against the other rail of the track. The distance between the two wheels corresponds to the track gage and is measured by strain gages 1 and 2 (see FIG. 1), the output signals of the strain gages being fed to the apparatus of FIG. 1.

The measuring bogie 77 measures or surveys the ordinate or alignment of the track, the output signals of strain gages 1 and 2 connected thereto again being fed to the computer apparatus 83. If desired, the strain gages may be replaced by potentiometers, in the manner of FIG. 3.

FIGS. 7 to 9 illustrate digital apparatus of the type generally described hereinabove, wherein high frequencies in the error signals are not filtered out to form a reference signal. Rather, a reference voltage is used to define the datum line. A specific binary number designates this reference voltage, i.e. when a reference voltage signal is fed to the analog-to-digital converter, it is converted therein into the specific binary number. As the error signal transducers, i.e. rotary potentiometers, strain gages, etc., produce different reference voltages in response and proportional to track position errors (see FIGS. 4 to 6), the different voltage inputs into the A/D converter produce correspondingly different binary number outputs therefrom. No adjustment of the reference value is required during operation since the reference voltage transducer is calibrated with electrical components which correspond in value and temperature characteristics with the components of the A/D converter. Thus, if any of the circuit elements heat up and change value in use and the reference voltage accordingly changes somewhat during operation, this has no bearing on the accuracy of the operation since the error signals are converted into binary code by the A/D converter and the corresponding circuit elements in the A/D converter heat up in the same manner.

Before describing the analysis system of FIGS. 7 to 9, the binary code used therein will be explained. To simplify that explanation, the binary code described is assumed to be a four-bit binary number although a 10-bit binary number has been used in practice.

The 4-bit binary numbers employed correspond to the decimal numbers 0–15 and start with 0000 and end with 1111, the highest number. When the datum line is defined so that it is between the last binary number starting with 0 (0111) and the first binary number starting with 1, (1000) the first digit or bit of the binary number conveniently indicates the direction of the error signal or deviation from the datum line. All binary numbers starting with 0 (e.g. 0000 through 0111) would then indicate positive errors and those starting with 1 (e.g. 1000 through 1111) would indicate negative errors. If a 10-bit binary number were used instead of a 4-bit code, the number of error signal which may be indicated in the system, i.e. the resolution of the system is correspondingly increased, but the principle of operation is identical.

Ignoring the first or sign bit, the exemplified binary numbers begin with decimal 7 (111) in the positive error region and reach their maximum value at 0 (000 ), starting at decimal 0 (000) in the negative error region and reaching their peak at 7 (111). The three binary bits on each side of the datum line are accordingly of identical value, except that an error in the positive error region is represented by the inverse of the binary number which reflects the identical error in the negative region.

Such a binary code is very useful in the present invention since the first bit in the binary number will always indicate the direction of the error and its classification into the correct error region, i.e. either positive or negative. However, it involves a small difficulty because, when an error occurs in the positive error region, the inverse of the binary number must be formed before the error can be classified in the correct region.

This difficulty is overcome by providing circuit element 105, as the following description of the circuit diagram of FIG. 7, in combination with the signal conditions therefor shown in FIG. 10 will show.

A reference voltage is supplied from source 85 to a strain gage 86, this voltage being, for instance, 1 volt. Any error or deviation in the track position from the datum line will flex a flexible rod 87 on which the strain gage is mounted to place the gage under strain and thus to change the reference voltage into a different voltage constituting the error signal, the voltage change being proportional to the track error or deviation. This error signal is then amplified in a signal amplifier 88 whose output signal is fed by conductor 89 to an analog-to-digital converter 97.

The analysis of the above circuit is, by way of example, to be described at point K of FIG. 2, it being assumed that the immediately preceding measuring value at point K' was stored in memory 90 as a binary number.

The entire circuit is controlled by a clock 95. This clock emits a train of clock pulses and a programming circuit 96 feeds specifically programmed clock pulses from this train to various circuit elements to energize and de-energize them.

Assuming that the analysis of the error signal at point K' has just been terminated, the programming circuit 96 will send pulse 4 (see $f$ in FIG. 10) to A/D converter 97. At the same instant, conductor 89 provides an analog measuring input to A/D converter 97 which input is immediately converted into a binary code representative of the magnitude of the measured error with respect to the datum (i.e. binary signals representative of the difference between the voltage of the error signal coming from the strain gage and the reference voltage). The A/D converter requires a period of time shown at $b$ in FIG. 10 for this conversion operation, i.e. the time span between the start of the fourth clock pulse and that of the first clock pulse. During the time interval required for the analog-to-digital conversion, a signal is sent from A/D converter 97 to program circuit 96 by conductor 98 to prevent the program circuit from sending out an operating signal until the analog input signal has been entirely converted into binary code. Thus, conductor 98 has two circuit conditions, i.e. logical 1 for conversion proceeding and logical 0 for conversion completed. When conductor 98 assumes a logical 0 and the set time period has expired, see $c$ in FIG. 10, a first pulse is fed by conductor 91 to a first storage unit 99, producing the following result:

The binary error signal, whose magnitude and direction is determined by the A/D converter 97 is transferred to storage unit 99. The first digit of the binary number, which indicates the region (positive or negative) of the error, is fed by conductor 100 to an exclusive-or gate 101. The exclusive-or gate has the function of determining whether a change in the region of error from positive to negative has taken place.

Since this is not the case at measuring point K, the function of circuit element 101 will be described in more detail later. However, the binary code is not only fed to element 101 but also to an inverter 105 which inverts all binary numbers whose first digit is a 0 (that is, in the case of positive errors). When the first digit is 1 (that is, in the case of negative errors), the binary code number passes through inverter 105 without change to conductor 106. Thus, when the error signal at point K is analyzed, the inverted value of the corresponding binary number must be formed.

It should be noted that the duration of the individual pulses is very short and the sequentially described functions during one pulse are, in fact, substantially simultaneously performed.

The second pulse from program circuit 96 (shown at $d$ in FIG. 10) follows immediately upon the first pulse and is fed by conductor 92 to memory circuit 90 to trigger the transfer of the inverted binary number on line 106 into memory circuit 90. This information is substituted in memory unit 90 for the binary number which was stored there in the preceding measurement which preceding number is fed by conductor 107 to three comparison circuits 108, 109, and 110. As will be clear from FIG. 2, the error information for point K is substituted in memory circuit 90 for the preceding error information taken at point K' which, as it so happens was still in the dead zone and, therefore, produced no pulse at any of the storage units. This condition changes, of course, with the error information produced for point K.

The comparison circuits 108, 109, 110, which have received the binary number, are connected to three memory circuits 111, 112, and 113, respectively, which store the values delimiting the error bands or regions. Thus, the binary number fed into the comparison circuits by conductor 107 is compared with the stored values to determine into which error band the impulse should be recorded. In the illustrated example, memory circuit 111 directs comparison circuit 108 to send a pulse through a conductor 114 to memory circuit 115 for the first error band, where the pulse is stored. If the error were in the second or third error bands, the impulse would be fed to, and stored in, memory circuit 117 or 119.

At this stage of the operation, the error in band 1 is stored independent of whether the error is in the positive or negative error region, since the chosen binary code is such that the binary number corresponding to a given error is the same in the positive and negative regions, in view of the operation of inverter 105. The appropriate classification is effected when pulses are transmitted to three band counters 120, 121, 122 (for positive errors) and three band counters 123, 124, 125 (for negative errors), which will be explained in connection with the analysis of the error at point L of FIG. 2, together with the transmission of the second pulse from program circuit 96 over conductor 92 and the third pulse over conductors 93 and 126 to a re-set element 127, all of which function only when the error reaches or passes through the border between the positive and the negative error regions.

So long as the error remains in the same region, the fourth impulse from program circuit 96 (see $f$ in FIG. 10) is fed over conductor 94 to the A/D converter 97 to inform it to execute the next analysis of the error signal corresponding to successive points $N_1$, $N_2$, $N_3$, $N_4$, $N_5$ and M (see FIG. 2). Each analysis functions in the same manner as described hereinabove in connection with the analysis at point K, except that the binary code information corresponding to points $N_5$ and M no longer influences the memory circuits for the first and second error band since a pulse has already been transmitted to these two memory circuits.

Assuming that the fourth impulse from circuit 96 is transmitted after the analysis of the error information for point M, the functioning of the computing apparatus will now be described when the error signal passes from the positive into the negative region. As in the analysis for point K, the analog measuring value for point L is converted into a binary number and this information is transmitted to first memory circuit 99 and to inverter 105. Simultaneously, the first digit of the binary code is transmitted by conductor 100 to exclusive-or element 101. Since the first digit of the binary number is 1 the element 105 has no function and transmits the input code unchanged to output line 106. However, the exclusive-or element is activated by the transmission of the first binary number digit, which has changed from a 0 to a 1 now that we are operating below the datum line, the function of this element being to indicate the change between the error regions from positive to negative.

As shown in FIG. 8, this is accomplished by means of three NAND gates 102, 103, 104 of exclusive-or element 101. The inputs to gates 102 and 103 carry the direct and/or inverted signals on leads 100 and 128 as will now be explained. One input of gates 102 and 103, i.e. input $\overline{128}$ and 128, is connected to storage unit 90, while their other inputs 100 and $\overline{100}$ are connected to storage unit 99. For producing input impulses $\overline{128}$ and $\overline{100}$, conductors 100 and 128 must of course, have incorporated therein circuit elements which invert the values of the impulses coming from storage units 90 and 99. Since such circuit elements are entirely conventional, they have not been shown in the already crowded circuit diagram.

The truth-table for exclusive-or gate 101 is as follows:

| Input | | | | | Output |
|---|---|---|---|---|---|
| 100 | $\overline{128}$ | $\overline{100}$ | 128 | | 131 |
| 0 | 0 | 1 | 1 | = | 1 |
| 1 | 1 | 0 | 0 | = | 1 |
| 1 | 0 | 0 | 1 | = | 0 |
| 0 | 1 | 1 | 0 | = | 0 |

The purpose of the circuit of FIG. 8, is to ascertain whether the input digit is the same as that of the first digit of the binary number corresponding to the preceding error information transmitted to gate 101 through line 128, i.e. that of the error at point M, which is still stored in memory circuit 90 at this time. Accordingly, in FIG. 8 the third NAND gate 104, which is connected to NAND gates 102 and 103 by conductors 129 and 130, transmits a pulse when logic condition 1 is indicated at input 100 and condition 0 is indicated at input 128, or vice versa. The inverted values are needed only to simplify the electronic operation.

When the differential value at L is analyzed, exclusive-or element 101 detects a change in the error regions and transmits a signal through conductors 131 and 132 to operate re-set multivibrator 127 for the band memory circuits 115, 117 and 119, see also FIG. 9. Simultaneously, circuit condition 1 in conductor 131 causes the pulses stored in band memory circuits 115, 117, 119 to be transmitted to read-out units 133, 134, 135.

However, since only the pulse stored in the highest error band is to be recorded, the pulses of the band memory circuits are compared on the basis of the Johnson code, which is well known in the computer art.

The read-out units 133 to 135 function on the basis of the Johnson code, each comprising a NAND gate and an inverter. As can be seen in FIG. 9, the NAND gate of unit 133 is connected to the output of memory circuit 115 and the inverted output of memory circuit 117, the NAND gate of unit 134 is connected with the output of storage unit 117 and the inverted output of storage unit 119, and NAND gate 135 is connected with the output of unit 119 and the output of unit 115.

The illustrated circuit makes it possible to transmit an impulse to the counters from band storage units 115, 117, 119 when circuit condition 1 prevails in line 131 and the same circuit condition prevails at the inputs of the NAND gates.

Considering the operation of the apparatus when the value for point L of the error graph of FIG. 2 is analyzed, the above-described condition is attained at the NAND gate of read-out unit 134 and in conductor 139 because circuit condition 1 prevails in line 2 as well as in line 3. No error is registered in band storage unit 119 because the point H of the error curve was in band 2. Because of the inverter gate, this causes line 139 to be in circuit condition 1.

The input at unit 133, on the other hand, is 1 at input 1 and 0 at $\overline{2}$, since input 2 is at 1, wherefore there is a pulse at the output of the NAND gate of the unit, and because of the inverter gate, the circuit condition in line 138 is 0. This also holds true for line 140 since input 3 is at 0 and input 1 is at 1.

Pulse 2 from program circuit 96 causes the binary code information to be sent through line 106 to memory circuit 90 where it replaces the binary code stored from the preceding measurement at point M, with the exception of the first binary number digit which is transmitted to an intermediate storage unit (such as a flip-flop (not shown) within storage unit 90). The transmission of the binary code from unit 90 through line 107 is effected in the above-described manner but no pulse is transmitted to the band memory circuits since the error signal for the point M is still in the dead zone or band. The first binary digit now stored in memory circuit 90 is transmitted by line 128 to exclusive-or element 101 to set inputs 128 and $\overline{128}$ properly. The impulse in line 136 is again divided into circuit conditions 136 and $\overline{136}$, the effective circuit condition being 136. If line $\overline{136}$ is in circuit condition 1, the error is in the positive error region while it is in the negative region when its circuit condition is 0. The read-out is again effected by means of one NAND gate per error band and error region. A pulse is transmitted to one of the counters only when both inputs of a NAND gate have circuit condition 1. This causes the voltage in lines 142 to 147, which lead to the counters, to drop, and the respective counter is advanced by one unit. NAND gates 142–147 are herein referred to as sign gating means. Furthermore, the change in voltage level, e.g. from 1 to 0 due to the second pulse in line 92 will cause re-setting of the band memory circuits 115, 117, 119 via NAND gate 141 before the next binary number is received in comparison circuits 108, 109, 110.

After this circuit operation has been terminated, the program circuit 96 will transmit the third impulse again through a change in the voltage level from 1 to 0. This impulse causes re-setting of the re-set element 127.

After completion of this circuit operation, the fourth impulse is transmitted to operate the analog-to-digital converter to convert the next analog input signal.

It will be obvious to those skilled in the art that different binary codes than those described herein, as well as different electronic elements, may be used to function in an equivalent manner. The time intervals wherein the analog input signals are converted may be programmed according to desire and may vary, for instance, between 20 and 40 ms.

It is also possible to use the filtered low frequencies of the error signals as controls for lifting the datum line when the ordinates of the track are measured in a curve, which requires special circuit elements.

We claim:

1. A system for monitering the deviation in a first or second direction of the actual position of a track from a desired position along a predetermined length of said track, comprising, in combination, error signal means for furnishing an error signal having an amplitude corresponding to the amplitude of said deviation and a positive and negative sign for deviations in said first or second direction respectively; transfer signal furnishing means connected to said error signal furnishing means for furnishing a transfer signal in response to a change in said sign of said error signal; storage means connected to said error signal furnishing means to be reset in response to a reset signal, for furnishing a storage signal only if the maximum amplitude of said error signal following receipt of one of said reset signals exceeds a predetermined amplitude; first and second counting means; activating means connected to said transfer signal furnishing means, said storage means and said counting means and responsive to said transfer signal for activating said first counting means to advance by one count in response to said storage signal only when said sign of said error signal is changing from a positive to a negative sign and for activating said second counting means to advance by one count in response to said storage signal only when said sign of said error signal changes from a negative to a positive sign; and reset means connected to said transfer signal furnishing means and said storage means for furnishing said reset signal to said storage means in response to said transfer signal but after a delay time sufficient for operation of said counting means, whereby the count on said first and second counting means signifies the number of track length intervals between successive substantially zero deviations of said track position wherein said amplitude of said deviation exceeded an amplitude corresponding to said predetermined amplitude of said error signal in said first and second direction respectively.

2. A system as set forth in claim 1, wherein said storage means comprise first and second storage means for furnishing a first and second storage signal respectively when the maximum amplitude of said error signal exceeds a first and second predetermined amplitude respectively; wherein said first and second counting means comprise first and second, and third and fourth band counting means respectively; and wherein said activating means comprise means for activating said first band counting means to advance by one count in the presence of said first storage signal and said second band counting means to advance by one step in the presence of said second storage signal if said sign of said error signal changes from a positive to a negative sign, and to advance said third band counting means by one count in the presence of said first storage signal and said fourth band counting means by one count in the presence of said second storage signal if said sign of said error signal changes from a negative to a positive sign.

3. A system as set forth in claim 2, wherein said first and second storage means comprise, respectively, first and second comparator means for comparing said error signal to a first and second predetermined reference signal respectively and furnishing, respectively, a first and second comparator output signal when said amplitude of said error signal exceeds the amplitude of said first and second predetermined reference signal respectively, and first and second band storage means respectively connected to said first and second comparator means for storing said first and second comparator output signal respectively, thereby furnishing said first and second storage signal.

4. A system as set forth in claim 3, wherein said first and second band storage means comprise a first and second storage flip-flop respectively.

5. A system as set forth in claim 3, wherein the amplitude of said second reference signal exceeds the amplitude of said first reference signal; and wherein said reset means further comprise means for resetting said first band storage upon setting of said second band storage.

6. A system as set forth in claim 3, wherein said amplitude of said second reference signal exceeds the amplitude of said first reference signal; and wherein said activating means comprise gating means having inputs connected to said first and second band storage means and outputs connected to said first, second, third and fourth band counting means, for applying said first storage signal to said first and third band counting means only in the absence of said second storage signal.

7. A system as set forth in claim 6, wherein said error signal furnishing means comprise means for furnishing an analog error signal, and analog-digital converter means, operative under control of converter timing signals, for furnishing a sequence of digital error signals, each having a sign bit indicative of sign of said error signal, in response to said analog error signal; further comprising program control means for furnishing timing signals including said converter timing signals, first and second memory control signals and third timing signals, first memory means connected to said analog-digital converter means for storing one of the so-furnished digital error signals under control of said first memory control signals, said first memory means having a first sign bit storage location for storing said sign bit, and second memory means for storing the digital error signal immediately preceding said one of said digital error signals, said second memory means having a second sign bit storage location for storing the sign bit associated with the digital error signals stored therein and a second memory output connected to the said comparator means.

8. A system as set forth in claim 7, wherein said transfer signal furnishing means comprise an exclusive OR gate connected to said first and second sign bit storage locations for furnishing said transfer signal only in the absence of one of said sign bits and the presence of the other.

9. A system as set forth in claim 7, wherein said gating means comprise amplitude gating means having a first input connected to said first storage means for receiving said first storage signal, a second input connected to said second storage means for receiving a signal in the absence of said second storage signal, a third input connected to receive said transfer signal and a first amplitude gating output, for furnishing a first gating output signal in the simultaneous presence of signals at said first, second and third input, and first and second sign gating means connected to said amplitude gating means and said second sign bit storage location, for, respectively, advancing said first and third band counting means by one count in response to said gating output signal and in the presence and absence of said sign bit in said second sign bit storage location respectively.

10. A system as set forth in claim 3, wherein said error signal furnishing means comprise sensor means coupled to said track and movable along the length thereof, bridge circuit means having a plurality of bridge circuit elements, means for coupling at least one of said bridge circuit elements, to said sensor means in such a manner that an electrical characteristic of said bridge elements changes thereby unbalancing said bridge circuit means when said position of said track deviates from said desired position, and output means connected to said bridge circuit means for furnishing said error signal in correspondence with said unbalance of said bridge circuit means.

11. A system as set forth in claim 10, wherein said error signal has high frequency components, and low frequency components resulting from undesired drift in circuit components; and wherein said error signal furnishing means further comprise means for suppressing said low frequency components thereby furnishing a corrected error signal.

12. A system as set forth in claim 11, wherein said corrected error signal is an analog error signal; wherein said first comparator means comprise a first and second threshold stage for furnishing a first and second threshold output signal respectively in response to a corrected error signal having an amplitude exceeding said first predetermined amplitude and having a positive and negative sign respectively; and wherein said second comparator means comprise a third and fourth threshold stage for furnishing a third and fourth threshold output signal when said amplitude of said corrected error signal exceeds said second reference signal and said sign is a positive and negative sign respectively.

13. A system as set forth in claim 12, wherein said first band storage means comprise a first and third flip-flop respectively connected to the output of said first and second threshold stage; wherein said second band storage means comprise a second and fourth flip-flop respectively connected to the output of said third and fourth threshold stage.

14. A system as set forth in claim 13, wherein said transfer signal furnishing means comprise means connected to the output of said first and second threshold stage for furnishing said transfer signal for a predetermined time interval following resetting of said first or said second threshold stage.

15. A system as set forth in claim 14, wherein said means connected to the output of said first and second threshold stage comprise at least one monostable multivibrator responsive to resetting of said first or second threshold stage, for furnishing a pulse constituting said activating signal, said pulse having a leading edge substantially coinciding with resetting of said first or second threshold stage and a trailing edge following said leading edge by said predetermined time interval.

16. A system as set forth in claim 15, wherein said reset means comprise a reset multivibrator having a stable and unstable stage, connected to the output of said monostable multivibrator and adapted to be switched to said unstable state when said monostable multivibrator returns to its stable state, said reset multivibrator having an output connected to said first, second, third and fourth band storage means for resetting said band storage means when switching from said unstable to said stable state.

17. A system as set forth in claim 13, wherein said activating means comprise first, second, third and fourth band gating means each having an output connected to corresponding one of said band counting means, a first input connected to said transfer signal furnishing means and a second input connected to said first, second, third and fourth flip-flops respectively, each for furnishing a signal advancing the corresponding one of said band counting means by one count in the simultaneous presence of signals at said first and said second inputs.

18. A system as set forth in claim 16, wherein said activating means comprise means for activating said counting means when the amplitude of said error signal changes from an amplitude exceeding to an amplitude less than said amplitude of said first reference signal.

* * * * *